Patented Nov. 28, 1950

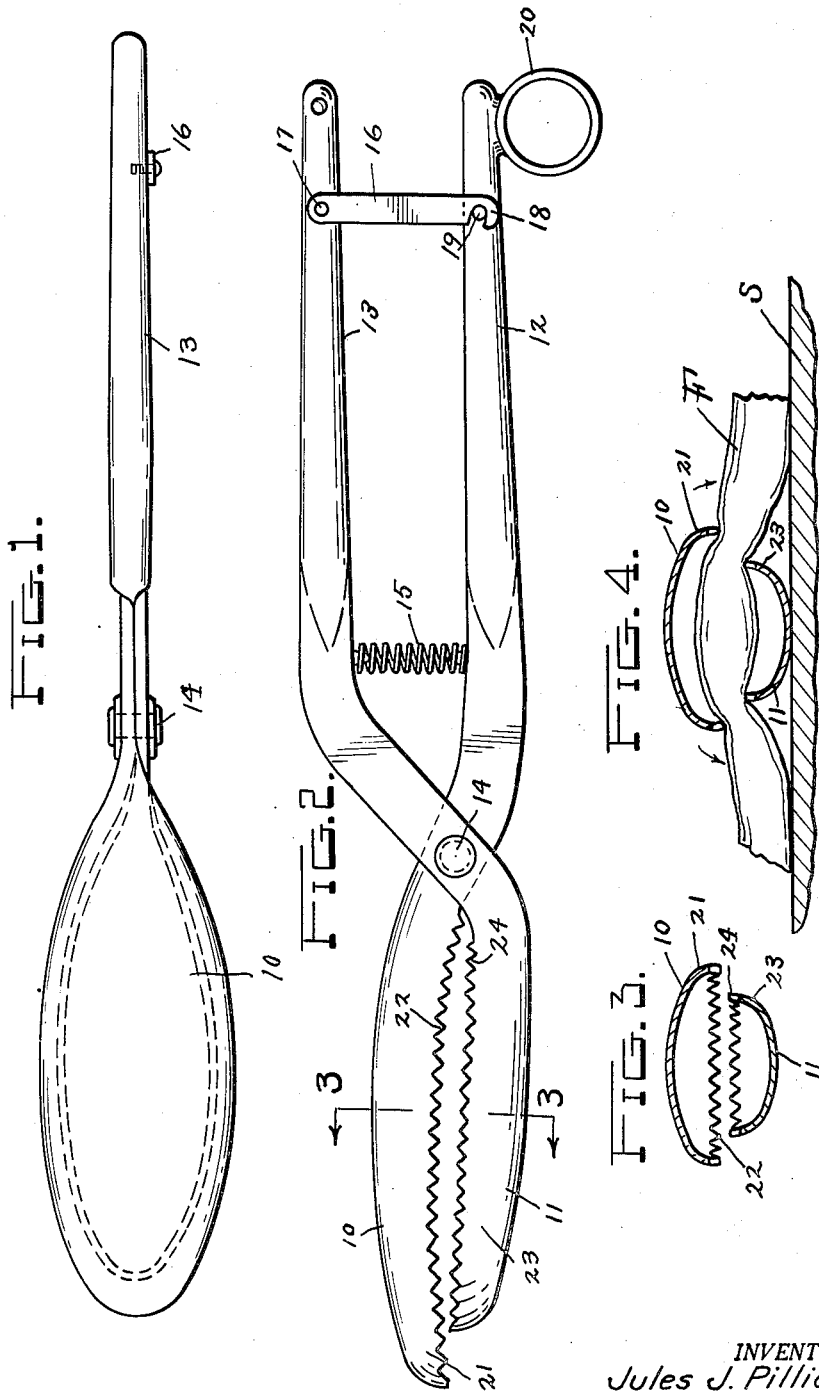

2,531,987

UNITED STATES PATENT OFFICE 2,531,987

FISH HOLDING IMPLEMENT

Jules J. Pilliod, Toledo, Ohio

Application February 20, 1948, Serial No. 9,769

2 Claims. (Cl. 294—106)

This invention relates to fish holders for use, for example, in holding fish during scaling operations, hook removal and the like, and an object is to produce a new and improved fish holding implement which is adapted securely to hold a fish against a supporting surface to simplify and expedite the scaling operation; which has a minimum number of parts thereby enabling inexpensive manufacture and assembly; and which is formed with jaws of sheet material so designed that they may be produced from stamping operations.

Other objects and advantages will hereinafter appear, and for purposes of illustration but not of limitation, an embodiment of the invention is shown on the accompanying drawing in which:

Figure 1 is a top plan view of the fish holding implement;

Figure 2 is a side elevation of the implement;

Figure 3 is a transverse sectional view on the line 3—3 of Figure 2; and

Figure 4 is an enlarged sectional view of the jaws in clamping engagement with the body of a fish showing the manner in which the fish is crimped so as to be held against a flat supporting surface.

The illustrated embodiment of the invention comprises a fish holding implement having an upper jaw 10 and a lower jaw 11, the upper jaw being rigid with a handle 12 and the lower jaw 11 being rigid with a handle 13, the handles being arranged in crossing relation and pivotally connected by a stud 14. A helical coil spring 15 is interposed between the handles yieldingly to urge the jaws apart. In this instance, a catch arm 16 pivoted to the outer end portion of the handle 13 at 17 has a hooked end 18 to engage a pin 19 projecting from the handle 12. This holds the jaws in closed position. A ring 20 is rigid with the outer end of the handle 12 for convenience in handling the implement.

Each of the jaws 10 and 11 is longitudinally elongate and generally oval in shape, the upper jaw 10 being provided with a downwardly extending flange 21 extending entirely about the jaw. The lower edge of the flange is provided with a series of teeth 22. Similarly, the lower jaw 11 is provided with an upstanding peripheral flange 23 on the upper edge of which are formed teeth 24.

The upper jaw 10 is somewhat wider than the lower jaw as exemplified in Figures 3 and 4. This is particularly of advantage for holding a fish in the desired position during scaling operations, and as shown in Figure 4, by resting the lower jaw 23 upon the supporting surface S, a fish F may be clamped between the jaws, and the upper jaw 10, due to being wider and in overlapping relation to the lower jaw, crimps or flexes the fish downwardly against the supporting surface. In this manner, the fish can be more readily scaled and as the scaling progresses, the implement may be moved longitudinally along the fish body in order to present the entire surface of the body for scaling.

The front end of the jaw 10 projects outwardly a substantial distance beyond the end of the lower jaw 11. This enables a fish more readily to be engaged in the mouth to be held, for example, during removal of the hook or for other purposes. It also should be noted that the upper jaw is curvilinear or arched longitudinally whereas the lower jaw 11 has a relatively straight support engaging surface. Both jaws are concavo-convex and may be produced inexpensively from sheet stampings.

It is to be understood that numerous changes in details of construction, arrangement and operation may be effected without departing from the spirit of the invention especially as defined in the appended claims.

What I claim is:

1. A fish holding implement comprising a pair of elongate sheet metal concavo-convex jaws, pivotally connected handle means for operating said jaws, peripheral teeth on each jaw facing in a general direction toward each other, one jaw being wider throughout its length than the other and being arched longitudinally in order to accommodate the transverse curvature of a fish, and the other jaw having a surface to engage a support.

2. A fish holding implement as claimed in claim 1, in which the wider jaw projects substantially beyond the outer end of the other jaw.

JULES J. PILLIOD.

REFERENCES CITED

The following references are of record in the file of this patent:

UNITED STATES PATENTS

| Number | Name | Date |
|---|---|---|
| 579,347 | Kellnor | Mar. 23, 1897 |
| 614,387 | Hargis | Nov. 15, 1898 |